April 2, 1968   N. E. ENGBORG ETAL   3,375,751
NEGATIVE AND PRINT DENSITOMETER
Filed March 16, 1964

INVENTOR
NELSON E. ENGBORG
RICHARD C. BEITZ
BY
ATTORNEY

United States Patent Office 3,375,751
Patented Apr. 2, 1968

3,375,751
NEGATIVE AND PRINT DENSITOMETER
Nelson E. Engborg, Old Greenwich, and Richard C. Beitz, New Canaan, Conn., assignors to Barnes Engineering Company, Stamford, Conn., a corporation of Delaware
Continuation-in-part of application Ser. No. 338,667, Jan. 20, 1964. This application Mar. 16, 1964, Ser. No. 352,180
6 Claims. (Cl. 88—14)

ABSTRACT OF THE DISCLOSURE

A densitometer for reading prints and negatives is provided with a diffusing screen illuminated from below, a small opening in the screen and a light pipe extending from the illuminating means to the small spot, the end of the light pipe being preferably slightly depressed from the surface of the screen and slightly roughened to prevent imaging of filaments of the light source. A negative or print can be moved over the screen until a particular point, the density of which is to be read, is over the small opening and receives therefrom a brilliant beam of light from the lighting means. A detector of dimensions substantially the same as the small opening, and which is preferably a solid state detector such as lead sulfide, is mounted on an arm which can be swung laterally in a pillar provided with a notch so that when it is swung to drop in the notch the detector is substantially in contact with the negative or print and aligned with the small opening. In order to prevent shadows on the screen a diffusing screen is mounted between the light and the screen but not between it and the light pipe. A meter reads light striking the detector and is provided with electronic circuits permitting adjustment of the meter for densest and least dense portions of the negative or print. The negative is moved until a small point, the density of which is to be measured, is over the small opening, the detector arm swung into place, and the electrical output from the detector measured on the meter.

Related applications

This application is a continuation-in-part of our copending application Ser. No. 338,667, filed Jan. 20, 1964.

Background of the invention

The principles of the densitometer are well known. Throughout the specification and claims the term "densitometer" is used in its general sense as an instrument for measuring absorption and not in a more restricted sense as measuring photographic density which is the logarithm of the absorption. Densitometers in general involve means for shining light through a negative onto a radiation detector and means, usually a meter, for reading density in terms of light passing through various portions of the negative or of a material such as a photographic print. Ordinarily a densitometer is provided with calibrating means, often employing a Wheatstone bridge circuit with a radiation detector in the form of a resistance which changes with illumination in one arm of the bridge. It is usually also customary to provide for calibrating the bridge by balancing it for a particular amount of light on the radiation detector. It is also possible to provide with an additional control so that the range of reading may be varied where densities vary over a very wide range, or in very different parts of the range, are to be measured.

A problem is presented for the rapid determination of density in negatives and prints produced by an infra-red thermograph. One of the important uses of a thermograph is to measure the temperature of the skin of the human body, producing pictures in the form of a raster in which the temperature of the skin is reproduced in various shades of gray. Such thermograms have achieved success as a diagnostic tool, for example in the diagnosis of cancer or other diseases which result in an increased skin temperature over the site affected, or other types of physiological malfunction such as vascular blockages and the like.

While in many cases indication is so clear that it is easy to read the thermograms, in other cases it is desirable to obtain a more accurate comparison than is available with the human eye. For example, in the case of thermograms for use in diagnosis of suspected breast cancer, the absolute tempertaure of the skin is of far less importance than the relative temperature of the same spot on either side of the body. This requires a comparison of areas on a thermogram which are separated quite a distance from each other, a type of comparison for which the human eye is very poorly suited, and is much less accurate than quantitative densitometric measurements. At the same time, the physician's time is limited, and speed is important as well as accuracy. Similar problems arise with negatives and prints of other types, but as the problem is most acute in thermograms, this type of negative or positive will be described as a typical instance in which the apparatus of the present invention finds practical utility.

A small radiation detector, such as a lead sulfide cell or similar photoconductor, can be used to measure light passing through various parts of a negative or print, the photoconductor being employed as one arm of a bridge circuit. As it is often necessary to compare areas on a negative or print which are quite a distance apart, it is essential that the negative or print which, in the description which follows, will be referred to as a thermogram can be moved around with respect to the radiation detector. It is readily possible to provide a source of illumination, such as a ground glass in the panel of a box with a light underneath it, and the thermogram can easily be moved to various positions so that when the small radiation detector is in position, different parts of the thermogram can be read for light transmission. In order to investigate relatively small areas with accuracy it is necessary that the tiny radiation detector be in very close proximity, or preferably in actual contact with the thermogram when the reading is made. This presents a problem of moving the thermogram which is solved by providing suitable mechanisms for swinging the tiny radiation detector out of contact with the thermogram. For example, the detector may be at the end of a projection on an arm which can be turned on a suitable pillar with notches to provide for moving the radiation detector out of contact when it is started to swing the arm.

Even the specialized densitometer or comparator described still presents problems, and it is with a solution of these problems that the present invention more particularly and specifically deals. The principal problem is that when turned into position, the radiation detector is adjacent to or in contact with a very small part of the thermogram. It is desirable to be able to determine ahead of time just where the radiation detector will be located, but this presents considerable problems, because if a thermogram is moved about on a ground glass, it is difficult or impossible to determine just what portion of a thermogram will be in contact with the radiation detector before the latter is swung into position. For example, if a physician is examining a thermogram for the diagnosis of suspected breast cancer or vascular blockage, he wants to read rapidly two small areas of the thermogram, but they must be accurately located. For example, if a breast cancer diagnosis is desired, they must be corresponding positions on each breast, or in the case of vascular blockage, points above and below the suspected point at which a blood vessel is blocked. This is particularly difficult when thermograms in the form of prints are used, which is a common form, as the most modern thermographs use polaroid film for recording purposes.

The present invention produces a spot on the ground glass of intense illumination at the point which is under the radiation detector when the latter is swung into reading position. The intensity of illumination is sufficiently greater than the general illumination of the ground glass so that it is immediately apparent, as the thermogram is moved about on the glass, at what points readings will be taken when the radiation detector is swung into reading position. At the same time, the remainder of the ground glass is sufficiently illuminated so that the rest of the thermogram shows up clearly, so that the point of intense illumination can readily be located. As soon as the point desired is over the intense spot, the arm with the radiation detector is swung into reading position, and the meter registers the amount of light passing through the portion of the thermogram, and hence the density thereof at the particular point. The arm is then swung, the thermogram moved around to the next point which is to be measured, and the procedure repeated. The two meter readings, of course, give quantitative comparisons of the density of the two points on the thermogram.

It is possible to produce the spot of brighter illumination by a suitable projection lens on the illuminating light, and such organization of elements is included in the broader aspects of the present invention. However, for practical use, another modification is used, and constitutes the preferred embodiment. In this modification, a light pipe in the form of a rod of glass, transparent plastic or the like, is mounted flush in a hole in the ground glass plate exactly under where the radiation detector will be located when swung into reading position. However, such a light pipe, extending down to, though not necessarily in direct contact with, the light bulb, is completely useless unless it is cemented to the light bulb and has a cross-section substantially larger than the size of the lamp filament. In other words, it partakes of the disadvantages of projection systems with lenses. If the light pipe ends near but not exactly in contact with the illuminating light bulb, shadows are produced which make the densitometer practically useless for accurate reading. According to the present invention it has been found that when a second ground glass plate is mounted at the lower end of the light pipe, or near thereto, shadows disappear, and a brilliant spot is produced with no drawbacks.

*Brief description of the drawings*

FIG. 1 shows a densitometer utilizing the present invention in the form of a box with a slanting panel. Mounted on this panel is a ground glass screen over which a small radiation detector housing 3 for a small lead sulfided detector swings on an arm 4. The detector housing 3 is vertically movable through the arms so that it can be adjusted to just touch a print or negative on the ground glass when it is swung over it. A thumb screw 23 serves to clamp it. The arm 4 moves on a notched pillar 5 with a V-shaped notch 15 on the side adjacent the ground glass panel. This V-shaped notch provides for precise location of the detector 3 when the arm 4 drops into the notch. The whole arm turns within the pillar and is pressed by a spring (not shown). The figure shows the arm 4 in its elevated position swung away from the ground glass panel and the curved arrow shows the direction in which the arm 4 is swung to snap into the V-shaped notch 15 which acts as a detent.

Right below the detector, when in position, is an opening in the ground glass panel into which a light pipe 6 of glass or plastic extends. The opening has a dimension substantially corresponding to that of the radiation detector. This pipe leads down toward an incandescent light 13 (see FIG. 2). As a result there is a very bright spot in the center of the panel. In order to prevent shadows a second diffusing screen 14 is mounted near the end of the light pipe 6. The end of the light pipe 6 in the ground glass panel is preferably roughened so that no image of the lamp filament is projected and is slightly recessed so that movements of thermograms thereover will not polish the roughened surface. If desired the roughened end may be provided with a thin red filter as a lead sulfide cell responds strongly to red light whereas the human eye does not. This reduces the visual intensity of the central spot and, while not necessary to the operation of the invention, may be employed as an additional convenience. In FIGS. 1 and 2 the size of the light spot is somewhat exaggerated for clearness. The light pipe may be as small as 1/8″ or even in an extreme case 1/16″. The size chosen depends on the dimensions of the lead sulfide cell in housing 3.

Figure 2:
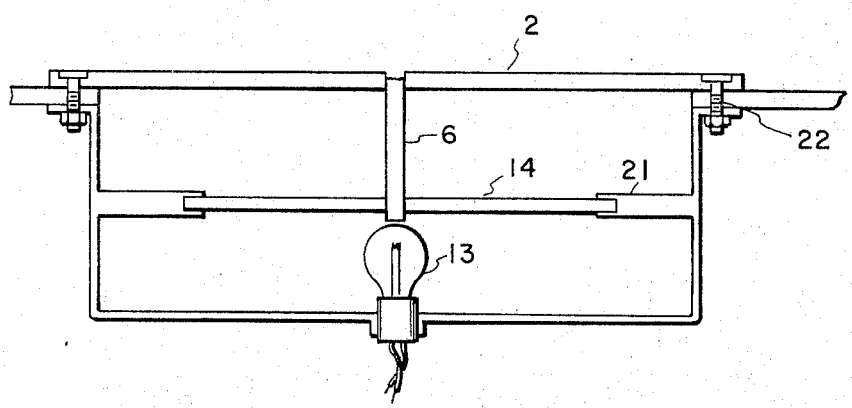
FIG. 2 is an isometric view of the ground glass screens, light pipe, and light.

It is important that the alignment of the light pipe 6 remain constant. With a stiff enough slanting panel for the box and a large enough light pipe, this may not present a serious problem but it is preferable to protect the instrument against any movement of the light pipe with respect to the ground glass panel 2 even if there is some distortion of the box which can occur if the operator's hand rests too heavily on it. Therefore, in a preferred aspect of the invention the light socket and the screen 14 is held in a rigid framework which is bolted to the panel 2. This framework is shown in FIG. 2 in the form of a thick metal strip carrying a socket for the light 13 and provided with side strips 21 which are bolted through the ground glass panel 2 by the bolts 22. Extensions on the side arms 21 also clamp the diffusing screen 14 rigidly. The whole mechanism of light, light pipe and two diffusing screens is, therefore, locked onto a rigid assembly which, however, floats with respect to the box, being attached only to the panel 2. Therefore, small warping of the box cover 1 will not change the alignment of the lamp and light pipe. It should be realized that accidental bending is very slight but because of the small size of the light pipe 6 even a little bending will change the illumination on the lead sulfide cell 3.

Figure 1:
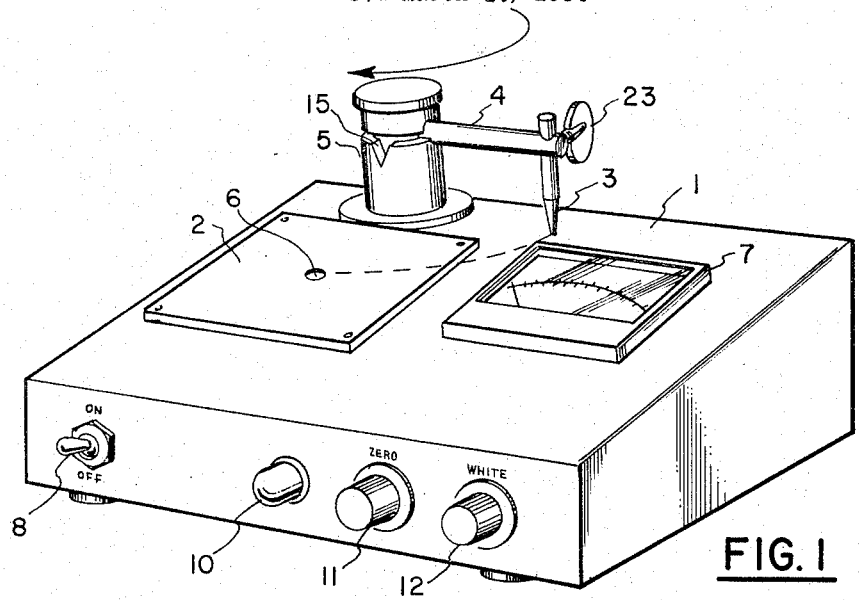
FIG. 1 is an isometric view of the top of a densitometer.
Figure 3:
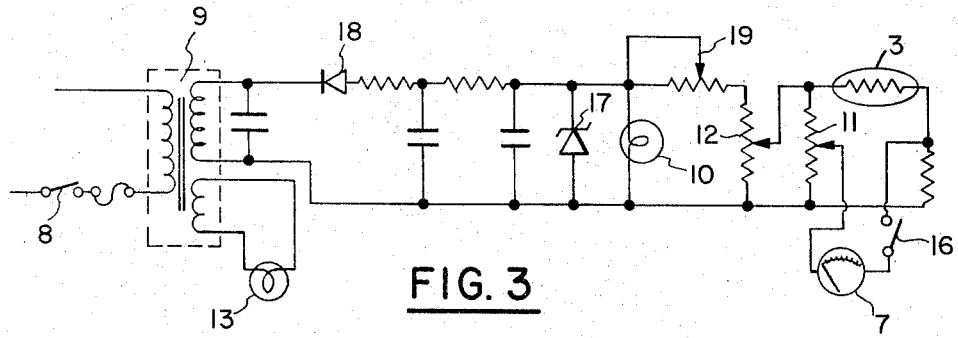
FIG. 3 is a simplified schematic of the instrument circuit.

FIG. 3 shows a simple schematic of the electronics of the invention. On the schematic the elements which also appear physically in FIG. 1 are given the same numerals. Power, such as ordinary 110 volt AC, flows through the primary of a saturable core transformer 9. The power is turned on and off by a fused switch 18. One winding of the transformer 9 energizes the lamp 13 and because of the nature of the transformer the brightness of the lamp remains quite constant over a fairly substantial change of line voltage. Another winding of the transformer 9 leads to a rectifying diode 18 and a conventional filter circuit. The DC output is regulated by the zener diode 17. When the switch is turned on a light 10 is illuminated appearing on the front of the box in FIG. 1. An adjusting rheostat 19 leads the output voltage to a potentiometer 12, the slider of which connects to one corner of a Wheatstone bridge in which the lead sulfide detector 3 is one arm. The other arms are two parts of a potentiometer 11 and a fixed resistor. The slider of the potentiometer 11 connects to one end of a meter 7, the other end going to the junction of the lead sulfide cell with the fixed resistor. Switch 16 is a microswitch which is actuated by movement of the arm 4 when it drops into the notch 15.

In use the instrument is first turned on with the switch 8 and a black part of a thermogram positioned over the end of the light pipe 6. The lead sulfide detector 3 is then swung over, its arm 4 dropping into the notch 15, which positions the cell in contact with the thermogram right over the end of the light pipe 6. This black position will be considered zero and the potentiometer 11 is then adjusted until the meter 7 reads zero. The arm 4 is then turned and the lightest portion of the thermogram positioned over the end of the light pipe 6. The cell is swung back into position as described above and now the meter will read some value because the bridge will be unbalanced. Potentiometer 12 is then adjusted until the meter reads 100 percent. Thereupon the thermogram may be moved, turning the detector 3 out of contact each time, and various portions of the thermogram read.

The meter 7 is preferably provided with two scales reading in opposite directions. This is useful when prints and negatives are used because sometimes it is desired to obtain readings compared to the darkest portion of the thermogram and in other cases compared to the lightest portion.

The electronic circuits are straightforward and conventional and while they are necessary to the operation of the instrument of the invention their particular detailed design is not, and any other circuits performing the same function may be used. Particularly the transformer 9 may be replaced by two transformers, one of the saturable core type for actuating the lamp 13 and another of ordinary type for the power supply the output of which is controlled in any event by the zener diode 17. Sometimes two transformers are cheaper than a single transformer because they are available commercially.

Let us assume we have a thermogram of a woman's breast for suspected cancer diagnosis. The thermogram is moved about on the ground glass screen until the spot of light 6 is beneath the suspected point on one breast. This will normally appear whiter in the print, or correspondingly darker in a negative. A reading is taken as described above, the arm 4 swung out of contact with the thermogram, and the thermogram moved to the corresponding point on the other breast. The arm 4 is then swung back and a second reading is taken. The difference between the two readings is expressed quantitatively by the difference in the two meter readings, and this is just as accurate whether the points on the thermogram are a considerable distance apart as if they were adjacent, whereas ordinary inspection by eye is much more accurate for areas adjacent to each other than for areas which are quite a distance apart, because the human eye is quite sensitive to contrast. The meter, however, reads with the same accuracy regardless of the separation of the two spots. If a print is used, one scale on the meter will be read and the other scale if it is a negative.

Sometimes the suspected spot may be darker in a print or lighter in a negative, which would correspond to a lower skin temperature. Thus, for example, if a fatty cyst were suspected, which normally displays a lower skin temperature, the first reading might be on the suspected point and the second reading on the corresponding point on the other breast. In this case, of course, if in fact there was a fatty cyst, there would be a difference in reading but it would be the reverse of that which occurs if there is a possibility of malignancy. It should be understood, of course, that the diagnostic use referred to above is only as one diagnostic tool, because skin temperature, while it has a good negative correlation with malignancy, merely shows that there is something hot underneath. This may be a malignant tumor, or it may be any other kind of inflammation, such as an abscess. It should be noted that it is possible at all times when the thermogram is being moved about to see the whole of the thermogram, and therefore various points of interest can be picked out accurately and reliably, because the brilliant light coming from the end of the light pipe 6 shows up through the thermogram while it is being moved around.

For many purposes and in many thermograms it is desired to read densities in terms of percentages of the lightest and darkest areas appearing, which will vary with different negatives and prints. This is why it is desirable to provide for adjustments both for zero or darkest points, and for white or lightest points. Adjustment with the potentiometers 11 and 12 is so rapid that this can be done wherever one thermogram differs markedly from another, and so the readings of the meter can be spread out to a maximum degree, giving the highest accuracy of reading for any particular thermogram. This is of particular importance with thermograms of very low contrast, where a stretching out of the meter reading can contribute markedly to increasing accuracy.

The essential features of the present invention involve the uniformly illuminated ground glass and the spot of brilliant light thereon aligned with a radiation detector. It is not particularly important what radiation detector is used, except that for accurate work its size must be small. Photoconductors such as lead sulfide lend themselves admirably to the construction of such small area detectors, but any other radiation detector may be used, and the advantages of the invention are obtained regardless of the particular detector employed. Because of their compactness, however, the solid-state photoconductors are preferred.

FIG. 3 shows a circuit diagram in which the important feature of black-and-white adjustment is effected by using the bridge balance rheostat 11 for the darker or zero adjustment and the bridge supply adjustment 12 for the white. This has a number of practical advantages and is preferred, but it is merely typical of circuits which can effect the two adjustments, and in its broader aspects the invention is not limited to the preferred type of electrical circuit.

The use of an arm on a notched pillar to move the radiation detector to the predetermined point on the print or negative presents a number of practical advantages, but it should be understood that it is merely illustrative of one way of bringing the radiation detector accurately above the bright spot of light. In its broader aspects the invention is not limited to using this preferred construction.

The invention has been described in detail in conjunction with a densitometer in which the radiation detector is a very small one. This is the most important single field of the present invention but it should be understood that the advantages of the light pipe and the resulting bright spot in a ground glass or other screen can be used in densitometer in which the density is estimated by the human eye, for example, in the reading of X-ray negatives, portions of which are quite dense.

It is often desirable to have two levels of illumination. If this is done by changing the total light on the screen then the much higher illumination which would be necessary for very dense portions of a negative is so bright that other portions of the negative which are not dense would let through sufficient light so that the eyes of the observer see a brilliant large area and hence lose their accuracy in reading the dense portions. When the basic new feature of the present invention is used, namely a light pipe with means for preventing shadows, the very intense spot of illumination can be kept small enough to that a dense part of the negative can be examined over it without producing excessive light through other portions of the negative.

Thus in its broader aspects the present invention includes visual densitometers such as X-ray viewing boxes. In such cases often the size of the bright central spot may be considerably larger than in the case of the more specific aspect of the present invention where it is used in conjunction with a very small radiation detector that is swung over its location. When the eye is the radiation detector it is capable of viewing large areas and, therefore, this very sharp restriction no longer holds. Of course, even if the spot is somewhat larger it is still very small compared with the total diffusely illuminated screen.

We claim:

1. In a densitometer for viewing negatives and prints having illuminating means and a uniformly diffuse illuminated surface which is illuminated by transmitted light from the illuminating means and a uniformly diffuse illuminated surface which is illuminated by transmitted light from the illuminating means, the improvement which comprises means for projecting an intense small spot of light from the illuminating means to a predetermined point on the diffusely illuminated surface without production of shadows thereon, the projecting means receiving substantially undiffused light from the illuminating means, said means for producing the brightly illuminated spot comprises a light pipe of transparent material, said pipe extending from the bright spot on the illuminated surface to a point adjacent to the illuminating means, and a diffusely translucent screen adjacent the end of the light pipe near the illuminating means, said screen being of sufficient extent to eliminate shadows on the diffusely illuminated surface, but being positioned so that it is not interposed between the illuminating means and the pipe.

2. A densitometer for measurement of small areas comprising in combination,
  (a) a uniformly diffuse illuminated surface, means for illuminating said surface by transmitted light,
  (b) a movable radiation detector of small dimensions,
  (c) means for moving the detector over and closely adjacent to a predetermined point in the surface,
  (d) means for projecting an intense small spot of light from the illuminating means to the predetermined point on the diffusely illuminated surface without production of shadows thereon, the small spot having dimensions corresponding to the radiation detector,
  (e) readout means for the output of the radiation detector, and means for adjusting the sensitivity of said readout means for minimum and maximum radiation, said means for producing the brightly illuminated spot comprises a light pipe of transparent material, said pipe extending from the bright spot on the illuminated surface to a point adjacent to the illuminating means, and a diffusely translucent screen adjacent the end of the light pipe near the illuminating means but not positioned between the illuminating means and the pipe, said screen being of sufficient extent to eliminate shadows on the diffusely illuminated surface.

3. A densitometer according to claim 2 in which the radiation detector is a solid-state photoconductor mounted on an arm and capable of swinging horizontally over the uniformly illuminated surface to bring the detector above the end of the light pipe.

4. A densitometer according to claim 2 in which the illuminating means and screen near the end of the light pipe are rigidly mounted on a framework and the latter is bolted at one end only to the uniformly diffuse surface of section (a) of claim 2 so that the assembly of lamp, light pipe and diffusing screen constitute a rigid assembly, where by bending of any portion of the densitometer does not throw illuminating means and light pipe out of alignment.

5. A densitometer according to claim 4 in which the end of the light pipe in the illuminated surface is roughened and is slightly recessed from said surface, but having an unroughened end adjacent the illuminating means.

6. A densitometer according to claim 3 in which the arm swings on a notched pillar provided with a V shaped notch positioned so that when the arm drops onto the pillar the radiation detector is accurately aligned over the end of the light pipe.

References Cited
UNITED STATES PATENTS

| | | | |
|---|---|---|---|
| 2,101,710 | 12/1937 | Huber | 88—14 X |
| 2,167,884 | 8/1939 | Gartland | 88—14 |
| 2,437,411 | 3/1948 | Tuttle. | |
| 3,183,815 | 5/1965 | Kapany et al. | 350—96 X |

OTHER REFERENCES

Rudloff, Everett: "Simple Densitometer"; Photo Technique, April 1941, p. 62.

JEWELL H. PEDERSEN, *Primary Examiner.*

W. A. SKLAR, *Assistant Examiner.*